(12) United States Patent
Ifju et al.

(10) Patent No.: US 6,327,030 B1
(45) Date of Patent: Dec. 4, 2001

(54) SYSTEM, METHOD, AND COATING FOR STRAIN ANALYSIS

(75) Inventors: Peter Ifju, Alachua; Kirk S. Schanze, Gainesville; Yingsheng Wang, Gainesville; James Hubner, Gainesville; David Jenkins, Gainesville, all of FL (US); Wissam El-Ratal, Sterling Heights, MI (US); Anthony B. Brennan, Gainesville, FL (US); Liu He, Gainesville, FL (US); Yibling Shen, Gainesville, FL (US); Bruce Carroll, Newberry, FL (US)

(73) Assignee: University of Florida, Gainesville, FL (US)

( * ) Notice: Subject to any disclaimer, the term of this patent is extended or adjusted under 35 U.S.C. 154(b) by 0 days.

(21) Appl. No.: 09/370,519

(22) Filed: Aug. 6, 1999

(51) Int. Cl.$^7$ ........................................................ G01L 1/24
(52) U.S. Cl. ............................................... 356/32; 73/762
(58) Field of Search .............................. 356/32; 73/762, 73/800

(56) References Cited

U.S. PATENT DOCUMENTS

| | | | |
|---|---|---|---|
| 2,294,897 | * | 9/1942 | Ellis .................................. 73/762 |
| 2,325,116 | * | 7/1943 | Ellis .................................. 73/762 |
| 3,406,122 | * | 10/1968 | Racine ............................... 73/762 |
| 3,995,157 | | 11/1976 | Holub et al. . |
| 5,490,426 | * | 2/1996 | Shiga et al. ........................ 73/762 |
| 5,817,945 | * | 10/1998 | Morris et al. ...................... 73/800 |
| 6,072,568 | * | 6/2000 | Paton et al. ....................... 356/32 |

FOREIGN PATENT DOCUMENTS 1313058    4/1971   (GB) .

* cited by examiner

Primary Examiner—Richard A. Rosenberger
(74) Attorney, Agent, or Firm—Saliwanchik, Lloyd & Saliwanchik (57) ABSTRACT

The subject invention relates to a strain-sensitive coating, a strain measurement system, and a method to determine strains on substrate materials. In a preferred embodiment of the subject invention, the system includes a luminescent strain-sensitive coating and a strain field mapping system which can be used to create a strain map of the mechanical strain on a substrate material. The luminescent strain-sensitive coating of the subject invention is preferably a polymer-based coating, and can incorporate one or more luminescent compounds. The subject coating can be applied to produce a thin film on a substrate material, such as aluminum, steel, polymer, or composite. One or more characteristics of the luminescence emanating from the coating can then vary in relation to the strain on the substrate material. In a preferred embodiment, the change in the morphology of cracks in the coating can vary one or more characteristics of the luminescence emanating from the coating such that the strain on the substrate material can be determined by measuring the luminescence emanating from the coating.

52 Claims, 6 Drawing Sheets

SYSTEM, METHOD, AND COATING FOR STRAIN ANALYSIS

BACKGROUND OF THE INVENTION

The subject invention relates to the field of strain measurements. Examples of applications which can benefit from the subject technology include engineering analysis of strain on complex geometries, design analysis, and non destructive testing of structures. Accordingly, the subject invention can be utilized in the automotive, aerospace, civil structures, and sporting goods fields, as well as many others. Specific embodiments of the subject invention pertain to a strain-sensitive coating, a strain field mapping system, and a method for conducting strain analysis. The method and apparatus of the subject invention are particularly useful in the field of full-field strain analysis.

In the field of structural analysis, the ability to determine of the stresses which a structural body is experiencing can provide important feedback in the design and construction of such structural bodies. Typically, surface strain on the structural member provides information on the stresses that the body is experiencing. This information leads to the identification of stress concentrations, over stressed areas, and general stress mapping for design and comparison to predictive methods. Currently, a number of methods exist for measuring such surface strain, including point and full-field methods.

The point methods include electrical resistance strain gauge methods and methods employing electro-optic sensors and optical methods. These methods typically require the affixing of a plurality of sensors at various locations on a structural body, or stepping the sensor across the structural body, such that when the structure is stressed each sensor or step indicates the surface strain at one point. In order to determine the strain over an entire body, numerous sensors located at critically stressed points on the surface are required or numerous steps are required for movable sensors. Accordingly, these point methods can be cumbersome, making it difficult to determine the stresses over an entire surface of a structure.

A number of surface measurement techniques have been developed to overcome the limitations of the point methods, including brittle coatings, photoelastic coatings, moire methods, interferometric methods, and digital image correlation methods. Each of these methods can be useful for certain applications but have characteristics which limit their usefulness. Brittle coatings typically provide good qualitative information about the principal stress directions on objects. Some limitations of brittle coatings are that the part can only be tested in one loading configuration, it only provides limited quantitative information, and methods for automated data collection do not exist. Photoelastic coatings provide only the shear stress and principal stress direction information on objects and are typically cumbersome to apply to large bodies since the coating process is time consuming. Moiré methods are typically limited to flat objects and are not used on complex geometries. Interferometric methods such as holographic interferometry, electric speckle pattern interferometry and shearography require sophisticated vibration isolation greatly reducing their applicability. Digital image correlation methods lack the sensitivity required to test parts in the material linear range.

Accordingly, there still remains a need for a method and system which can easily and accurately measure full field strain on complex shaped structures. Even more advantageous would be a method and system which can provide real-time dynamic strain measurements, even at low strain levels.

BRIEF SUMMARY OF THE INVENTION

The subject invention relates to a strain-sensitive coating, a strain measurement system, and a method for determining mechanical strains on substrate materials. In a preferred embodiment of the subject invention, the system includes a luminescent strain-sensitive coating and a strain field mapping system which can be used to create a strain map of the mechanical strain on a substrate material.

The luminescent strain-sensitive coating of the subject invention preferably utilizes a polymer-based binder coating. The subject coating can incorporate one or more luminescent compounds. These luminescent compounds can absorb light from an illumination source and then emit light such that the light emitted by these luminescent compounds can emanate from the coating and be detected. In a specific embodiment, one or more luminescent dye(s) can be incorporated with, or added to, the binder. In a preferred embodiment the luminescent dye in the coating emits light over a band of wavelengths whose center is different from the wavelength band of illumination used to excite the dye. In a specific embodiment, the emitted light is red shifted from the illumination light.

The subject coating can be applied to a substrate material via one or more of a variety of methods. Such methods include, but are not limited to, electrostatic deposition, chemical vapor deposition, painting, spincoating, and dip coating. Preferably, the coating can be formulated so that it can be applied using aerosol technology to produce a thin film on a substrate material such as metal, polymer, ceramic, or composite. After the subject coating has been applied to the structural body, it can undergo a curing process. This curing process can include, for example, exposure to various environmental conditions for a variety of time durations.

In a preferred embodiment, a dry lake-bed pattern of cracks can be generated in the coating during the curing process. When the substrate material is subsequently subjected to strain, the crack morphology (e.g., crack opening, crack depth, crack density, crack length, and/or crack orientation) changes as a result of the strain in the substrate. Accordingly, the change in crack morphology can be used to investigate the strain in the underlying material by, for example, studying the changes in one or more of the characteristics of the light emanating from the coating. As an example, this crack morphology change can influence the overall intensity of the emitted light from the coating. In a specific embodiment, the intensity of the emitted light from the coating is a function of the strain state of the underlying material. In a full-field sense the emitted intensity can be used to map strain information on the surface of structural bodies and complex parts.

In another embodiment, the coating can be formulated and cured such that it is essentially uncracked after the curing process. In this embodiment, cracks can be produced during the application of mechanical strain. The density of cracks, as well as other aspects of the crack morphology, can change as a result of the strain in the substrate. Again, the change in crack morphology can be used to investigate the strain in the substrate by, for example, measuring changes in one or more characteristics of the light emanating from the coating. For instance, as the number of cracks increases, the intensity of light emitted from the coating can also increase. In addition, the intensity of the emitted light can also be a function of the crack morphology as previously described. The morphology of the crack pattern can then change as a result of changing strain in the underlying material. Accordingly, the emitted light intensity of the coating can be correlated to the strain in the underlying substrate material. The state of strain can thus be mapped on the surface of the substrate material.

The subject invention also pertains to a strain field mapping system for producing a map of the mechanical strain field on an underlying substrate. Changes in luminescence characteristics such as intensity, due to the strain field, can be imaged by a variety of techniques. In a specific embodiment the spatial resolution of the imaging equipment can be adjusted such that individual cracks in the coating are not observed in the image, but, rather, an average intensity that is related to strain is observed over a region. The method of the subject invention can then capture an image of the luminescent intensity distribution emanating from a substrate material and convert it into a map of the mechanical strain field on the underlying substrate material.

In preferred embodiment of the subject invention, after the underlying substrate material is coated with the strain-sensitive coating, the strain-sensitive coating can then be illuminated by one or more of a variety of illumination sources such that the incorporated luminescent compound(s) emits wavelength shifted light. In a specific embodiment, the subject strain-sensitive coating can be illuminated with near-UV or blue light such that a luminescent dye in the coating emits red-shifted light. An image of the luminescent intensity of the unstrain substrate can then be recorded. The substrate can then be subjected to mechanical strain and additional images recorded. In a specific embodiment, the changes in luminescent intensity can be deciphered by analyzing the images of the unstrained and strained substrate, resulting in an output map of the mechanical strain on the substrate.

DETAILED DESCRIPTION OF THE INVENTION

The subject invention relates to a strain-sensitive coating, a strain measurement system, and a method for determining mechanical strains on substrate materials. In a preferred embodiment of the subject invention, the system includes a luminescent strain sensitive coating and a strain field mapping system to create a strain map of the mechanical strain on a substrate material. The subject coatings can be composed of any number of polymeric or nonpolymer materials such as poly(methylmethacryate), poly(imide), poly(esters), polyamine, poly(melamines), poly(urethanes), melamine formaldehyde, ceramics, and glasses. These coatings can be applied to a variety of substrates such as metals, organic polymers, ceramics, and composites.

The subject coating can incorporate one or more binder materials, as well as one or more luminescent materials. In a preferred embodiment of the subject invention, the luminescent strain-sensitive coating is a polymer-based coating, incorporating one or more luminescent compounds. Examples of luminescent compounds which can be utilized with the subject coatings include conjugated organic dyes such as rhodamine B, poly(phenylenevinylene) and cyanines. For example, one or more luminescent dye(s) can be dispersed and/or dissolved in the polymer used to produce the coating. When these luminescent dyes are illuminated with a light source of a first wavelength, the dye molecule can absorb light from the illumination source and then emit light at a different wavelength. In a specific embodiment, the incorporated luminescent dye(s) emit red shifted light when illuminated with near-UV or blue light source.

In a specific embodiment of the subject invention, the luminescent strain-sensitive coating can be produced by mixing 0.450 g of ERL 4206 epoxy resin, 0.010 g of Epon 826 epoxy resin, 0.540 g of HY 918 hardener, 0.006 g of 4-(dimethylamino)pyridine,and 0.003 g of perylene in a test tube. The mixture can be allowed to stand for approximately 3 hours and then can be applied to a substrate using, for example, an air brush. After application the coating can then be cured at 50° C. for 12 hours.

In another specific embodiment of the subject invention, 0.3 g Rhodamine B luminescent compound is dispersed into a binder made from a solution of 100 g Melamine Formaldehyde resin, 4.0 g p-Toluenesulfonamide, 0.7 g Ammonium Chloride, 150 ml water, and 150 ml ethanol. Preferably, about 3 to 7 grams of plasticizerp-Toluenesulfonamide and about 0.5 to 2 grams of catalyst Ammonium Chloride should be added to about 100 g of resin, to enable the coating to cure quickly without becoming too brittle. The ratio of water to ethanol is preferably between about 7:3 and 3:7, and more preferably about 1:1. The mixture can be applied to a sandblasted structural component using a paint sprayer in a paint booth. The part can then be cured, at a relative humidity of approximately 10–20%, for about 17 hours at 43° C., resulting in a random dry lake bed pattern of cracks.

In another specific embodiment of the subject invention, 0.3 g of Rhodamine B is dispersed into a binder made from a solution of 100 g Melamine Formaldehyde resin, 4.0 g of p-Toluenesulfonamide, 0.7 g Ammonium Chloride, 150 ml water and 150 ml of ethanol. The mixture can be applied to a sandblasted structural component using an air-brush. The component can then be cured, at a relative humidity of approximately 10–20%, using a temperature program as follows: approximately 42° C. for about 10 hours, with the temperature gradually decreased from approximately 42° C. to approximately 25° C. over a period of about 2 hours. The essentially uncracked coating which results can have a translucent appearance.

Examples of other materials which can be used to produce a strain-sensitive coating in accordance with the subject invention include: poly-(methylmethacryate-co-butylmethacrylate), poly(melamine-formaldehyde), polyurethane, and hybrid organic-inorganic sol-gel. Examples of luminescent dyes which can be used in accordance with the subject invention include: 1,5,15,20-tetraphenylporphyrin zinc(II), trans-4-[4-(dimethylamino)

styryl]-1-methylpyridinium iodide, trans,trans-1,4-[bis-3,4, 5-(trimethoxystyryl)]benzene, and tris-(4,7-diphenyl-1,10-phenanthroline)-ruthenium(II) dichloride.

Preparation of the substrate material surface prior to the application of the subject coating can enhance the performance of the coating. In particular, it is believed that roughening the surface of the substrate material can help the formation of nucleation sites in the cured coating. These nucleation sites help generate cracks in the curing and/or cured coating. Also, roughening the substrate surface enhances adhesion of the coating to the surface. In addition, roughening the surface can cause the coating to emanate luminescent light in an essentially angle-independent manner. Such roughening can be accomplished by a variety of mechanisms, including sandblasting, sandpapering, and chemical etching. By encouraging smaller cracks, roughening can also give rise to reproducible, uniform cracking densities of, for example, about 10 cracks/mm. A chemical degreasing solvent can also be used on the surface of the substrate prior to the application of the coating.

The subject coating can be applied to a substrate material by, for example, atomization techniques such as aerosol techniques, electrostatic deposition, and chemical vapor deposition, and/or by non-atomization techniques such as painting, spin coating, and dip coating. Preferably, the coating thickness is approximately 60–120 microns, and more preferably approximately 80–100 microns, in order to optimize the sensitivity of the measurements. When utilizing aerosol application, it may take several passes to apply an appropriate thickness, with each pass applying about 7–10 microns of coating.

After the coating has been applied to the structural body, and appropriate curing processes implemented, the binder can have a pre-initiated series of cracks or an essentially uncracked surface prior to the application of mechanical strain to the substrate material. The crack pattern morphology change as a function of mechanical strain on the surface of the substrate material. The crack morphology can include the crack density, crack opening, crack depth, crack width, crack surface texture, crack orientation, and/or crack length. In reference to the changes which may occur as a function of applied load, one or more crack morphology changes may occur.

Once the subject coating is applied and cured, the coating can be illuminated by an excitation source. In a specific embodiment, one or more dyes in the coating can absorb excitation illumination and reemit light which is at a different wavelength than the excitation illumination. The excitation source can include, for example, continuous or short duration, coherent or noncoherent, polarized or unpolarized, filtered or unfiltered light.

Changes in the strain on the substrate can cause coating crack morphology changes which can influence one or more of a variety of characteristics of the light emanating from the luminescent coating, including state of polarization, intensity, spectral position, band shape, and emission decay time. By calibrating the relationship between strain in the substrate and one or more characteristics of the light emanating from the coating, the coating can be used for quantitative measurement of the strain in the substrate material.

Changes in the strain field of the substrate material can produce changes in the coating crack morphology which directly affect the proportion of luminescent light emanating from the coating. As a result, the luminescent intensity of light emanating from the coating is related to the mechanical strain on the underlying substrate material In a specific embodiment, the luminescentintensity emitted from the subject coating can increase as the structure is subjected to mechanical strain. For example, the visible luminescent intensity can be approximately linearly proportional to the mechanical strain on the underlying surface. Accordingly, the luminescent intensity distribution can be used to produce a map of the mechanical strain field on the underlying substrate.

The increase in luminescent intensity emitted from the coating as a result of coating crack morphology changes is due, at least in part, to the cracks enabling the light emitted by the luminescent compounds within the coating to escape the coating surface. In general, a portion of the luminescent light emitted by the luminescent compounds, for example one or more dye(s), is reflected back into the coating at the polymer/air interface as it is internally reflected. Cracks in the coating can interrupt a portion of this internal reflection and redirect and/or scatter the luminescent light such that the luminescent light can escape, and thus emanate, from the film. The cracks may also affect the amount of excitation illumination entering the coating, the absorption of the excitation illumination, and/or the location of such absorption.

Figure 4:
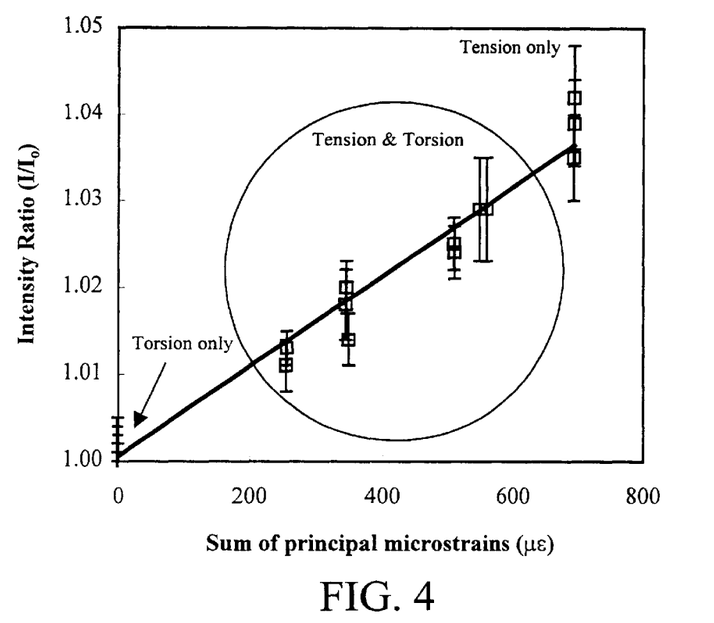
FIG. 4 shows a plot of the intensity ratio of luminescence light emanating from a coating versus the sum of principal strains for a cylindrical specimen loaded in tension and/or torsion.

In a specific embodiment, the relationship between the luminescent intensity emanating from the subject coating and the strain on the substrate material can provide information with respect to the addition of the two in-plane principal strains in the substrate material. This relationship is illustrated in FIG. 4 for a cylindrical specimen tested in a combination of tension and torsion. Separation of the two in-plane principal strains can then be accomplished by one of a variety of techniques. For example, an electrical resistance strain gauge can be used to determine one of the in-plane principal strains, allowing the other in-plane principal strain to be arrived at by substrating from the addition of the two in-plane principal strains. In a specific embodiment, the subject coating can have photoelastic characteristics. Accordingly, as known in the art, polarizers and quarter-wave plates can be placed in front of the illumination source and imaging system enabling measurements which provide information with respect to the subtraction of the two in-plane principal strains. Combining the information obtained with respect to the addition of the two in-plane principal strains and the substration of the two in-plane principal strains, the individual in-plane principal strains can be determined. Preferably, the individual in-plane principal strains can be determined on a full field basis.

In a preferred embodiment, the subject invention includes a strain field mapping system for producing a map of the mechanical strain field applied to the underlying substrate. Upon receiving light emanating from the subject coating, the subject measurement system can measure one or more of a variety of characteristics of the received light, including state of polarization, intensity, spectral position, band shape, and emission decay time. Accordingly, one or more correlations between the strain on the substrate and the characteristics of the light emanating from the subject coating can be utilized to determine the strain on the substrate after receiving the light emanating from the coating and measuring one or more characteristics of the light. For example, changes in luminescence intensity, due to the mechanical strain, can be imaged by one or more of a variety of methods, including: 1) visual inspection; 2) still photography using silver halide film technology; 3) analog video photography; and 4) digital photography using a scientific grade CCD camera. Filters or other devices (such as polarizers, quarter-wave plates, and diffusers) for enhancing the image can also be used during the imaging process. In a specific example wherein a dye which emits red light is incorporated into the subject coatings, a red filter in front of the camera may be used to reject the excitation illumination. In each case, the spatial resolution of the visual system can be adjusted such that individual cracks are not observed in the image, but, rather, an average illumination intensity emitted from the coating is observed over a region.

One or more of a variety of methods can be utilized to calibrate how a particular characteristic of the luminescent light emanating from the coating varies with respect to strain on the substrate material. For example, a specimen can be taped on the substrate material such that the coating is applied to the specimen when applied to the substrate material, and cured in a like manner as well. The specimen can then be tested as to how the luminescent light varies with strain. These results can be used to calibrate the coating on the specimen and, therefore, the coating on the substrate material. Another technique involves the placement of some means for measuring strain at a point on the substrate, such as a strain gauge. The reading from the strain gauge can then be compared with the luminescent light from the coating in the vicinity of the strain gauge, in order to calibrate the coating. Alternatively, or in conjunction with other calibration methods, a sample bar can be coated and cured in a similar manner to the substrate material and calibrated in a special calibration set-up.

Figure 1:
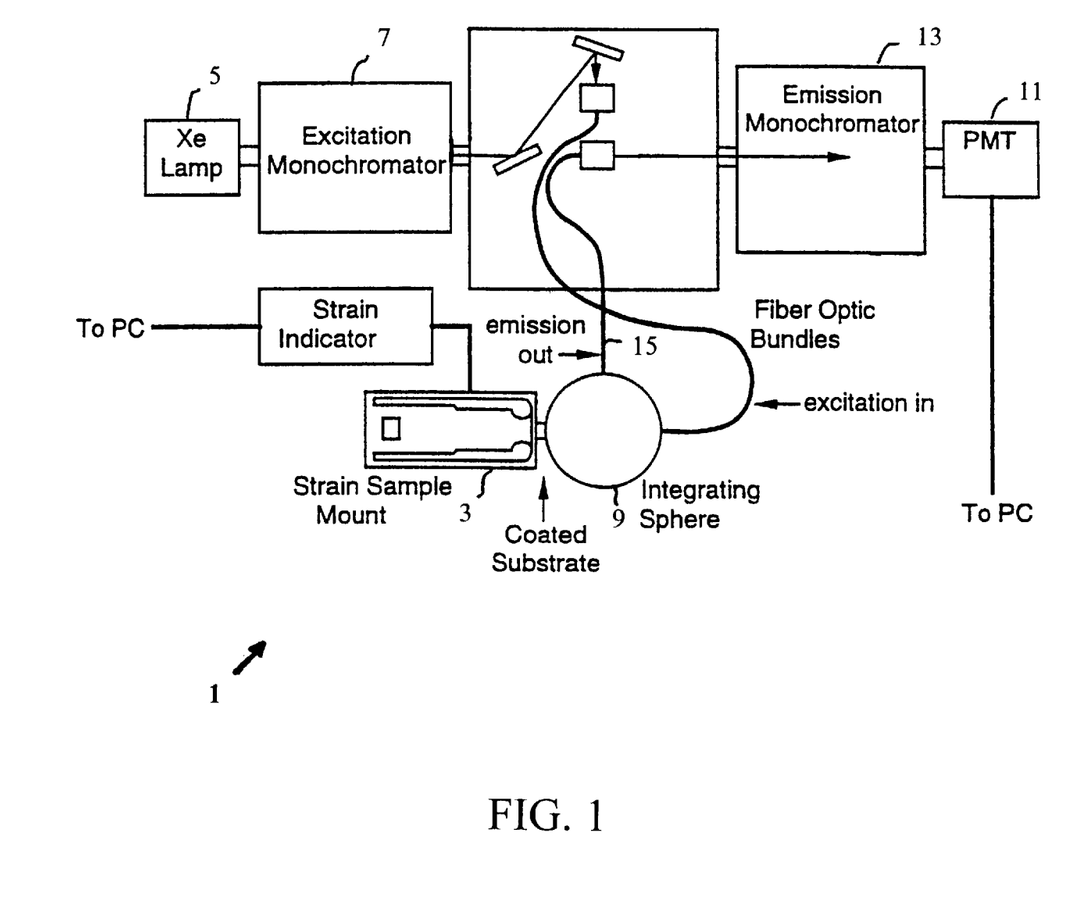
FIG. 1 shows a system for calibrating optical-strain response of strain-sensitive coatings, in accordance with the subject invention.
Figure 2A:
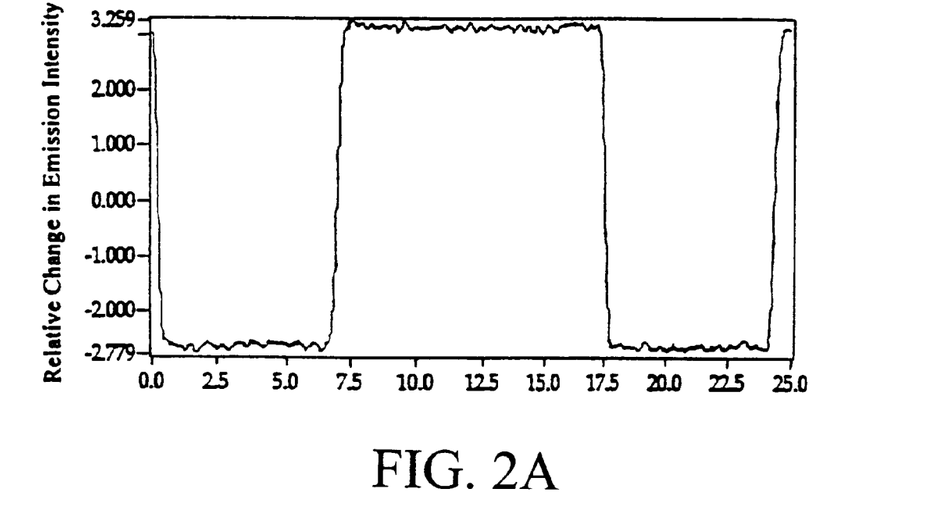
FIGS. 2A and 2B show the relationship between applied mechanical strain versus time (FIG. 2B) and change in percent luminescence emission intensity of a strain-sensitive coating versus time (FIG. 2A), recorded simultaneously using signal averaging and the system shown in FIG. 1.
Figure 2B:
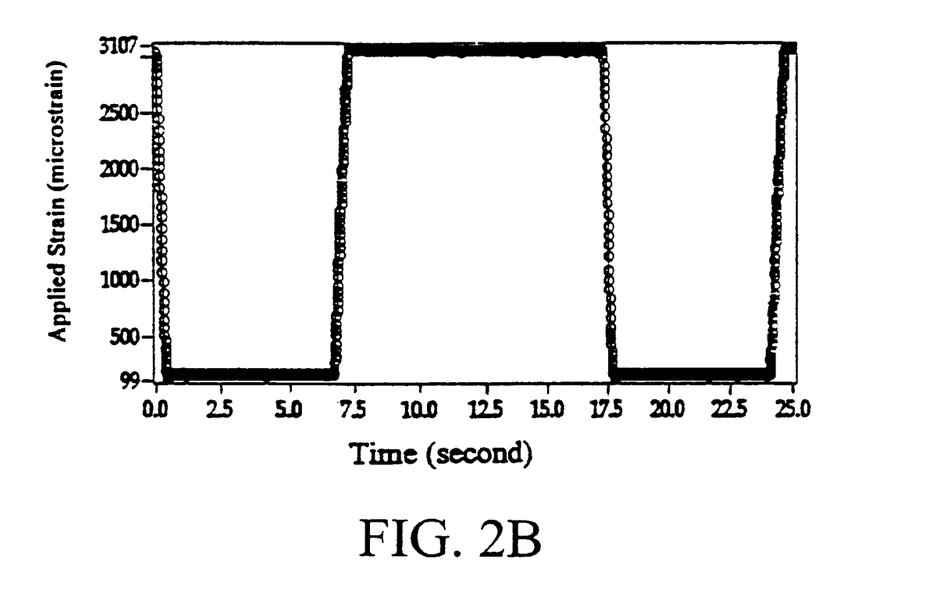

In another embodiment, referring to FIG. 1, a system 1 for calibrating the optical-strain response of a strain-sensitive coating in accordance with the subject invention is shown. The system 1 utilizes an aluminum specimen (12 inches long×0.5 inches wide×0.016 inches thick), coated with a strain-sensitive coating, mounted in a mechanical strain inducing device 3 (tensile load). Inducing device 3 can provide up to 3000 microstrain in tension. The coated specimen can then be illuminated with monochromatic light originating from, for example, a 150 W xenon arc lamp 5 and passed through a 0.25 mm monochromator 7. The luminescence emissions from the coated specimen can be collected by using an integrating sphere 9 to alleviate artifacts due to, for example, spatial inhomogeneity and/or polarization. The emission intensity can then be detected by an optical system consisting of a photon counting photo multiplier tube 11 that is mounted on a 0.5 m monochromator 13 which is coupled to the integrating sphere via a borosilicate glass fiber bundle 15. A computer system can simultaneously record the strain level that is applied to the specimen, for example sampled with strain gage, and also record the relative emission intensity from the coating.

In an alternative embodiment of the subject invention, the optical-strain response of the strain-sensitive coating can be calibrated by testing a specimen steel bar, 5 inches long by 0.25 inches thick and 0.75 inches wide. The steel bar can be loaded into a four point bending fixture. The top surface of the specimen, between the inner two loading contacts, is under pure axial loading. On the bottom surface, an electrical resistance strain gauge is used for calibration purposes. The specimen is coated on the top surface with the strain sensitive coating and the specimen is tested in the previously mentioned calibration set-up.

Figure 3:
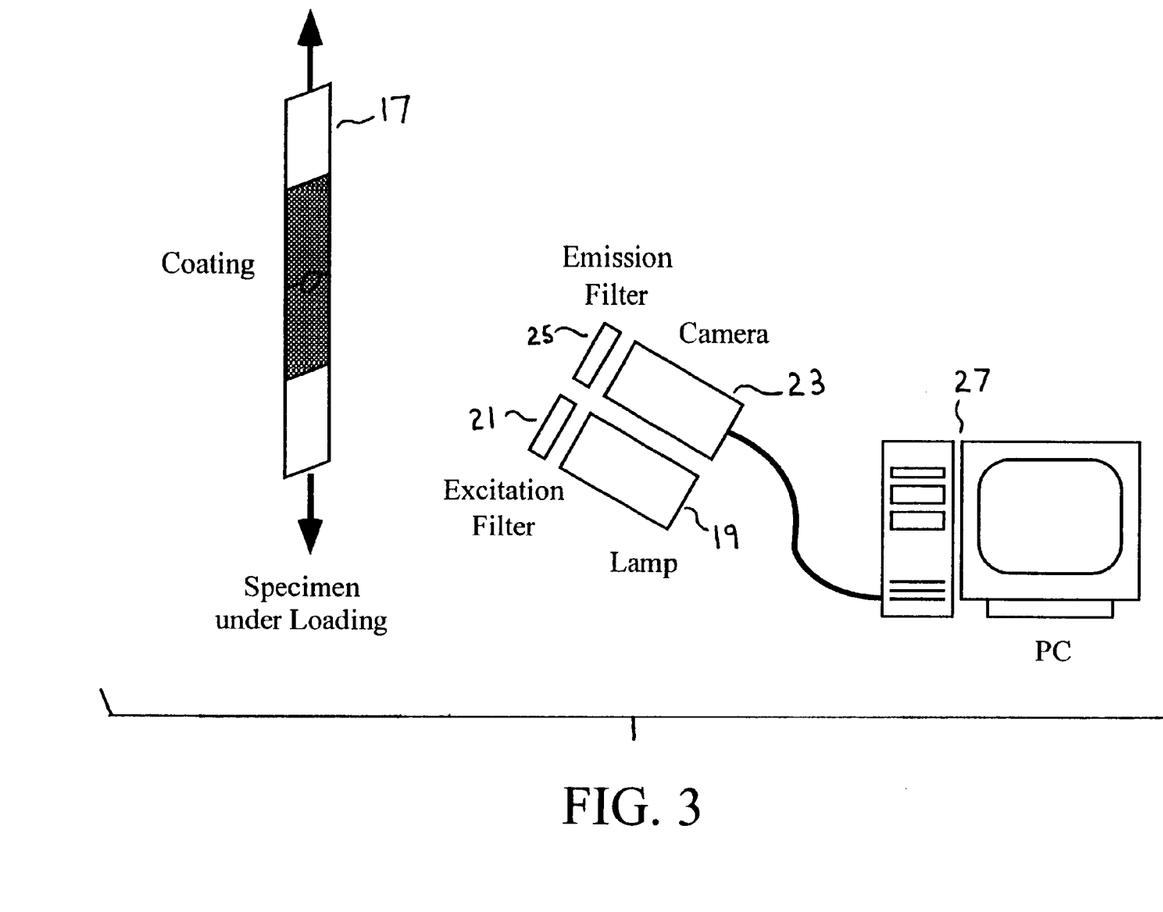
FIG. 3 shows a system which can be used to produce a stain map of an object coated with strain-sensitive coating.

A specific embodiment of a system used to produce a strain map of an object is shown schematically in FIG. 3. The system shown incorporates a device 17 to apply strain to a specimen that is coated with the subject coating. The system shown in FIG. 3 also incorporates a 50 W tungsten halogen lamp 19, a 400 nm interference filter 21 that is installed between the lamp and the specimen, a 14-bit CCD camera 23 that has a 600 nm interference filter 25 installed over the lens, and a desktop computer system 27 which runs image enhancing software. For a typical test, the luminescence intensity emitted from the coating is imaged with the camera prior to the application of mechanical strain, producing an image R. The object is then strained and a second image is acquired, producing image S. The strain map can then be produced by applying the following algorithm:

[strain map]=K*f([image S]/[image R])

where [strain map], [image S], and [image R] are matrices containing digital image data, f(v) is a smoothing function, and K is a calibration function. In a specific embodiment, K is approximately linear.

Following are examples which illustrate procedures for practicing the invention. These examples should not be construed as limiting.

EXAMPLE 1

Figure 5:
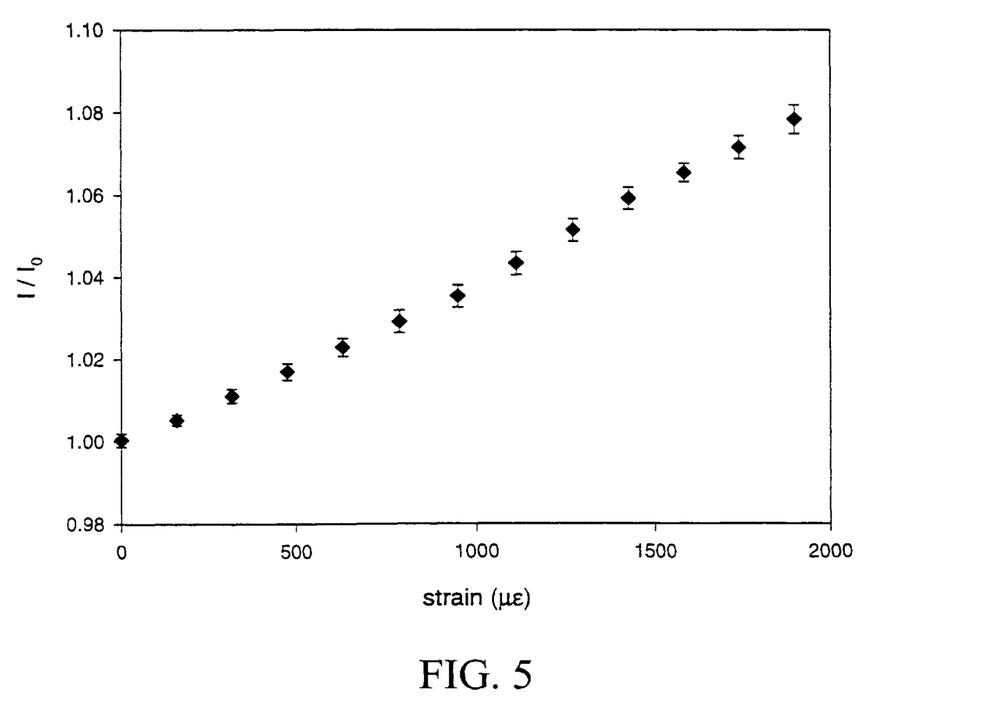
FIG. 5 shows the results of a typical calibration for axial strain specimens with giving the relationship between axial strain and change in the percentage of emitted light intensity.

This example describes a specific strain-sensitive coating in accordance with the subject invention. The binder and luminescent material used is melamine formaldehyde and Rhodamine B, respectively. FIG. 5 shows the results of calibrations for a series of specimens coated with such a coating. The plots show relative change in intensity versus the microstrain on a four point bend specimen. This plot illustrates the response of the coating is nearly linear with no noticeable threshold, and high repeatability. The coating intensity changed by approximately 7% from 0 to 1900 microstrain.

EXAMPLE 2

Figure 6A:
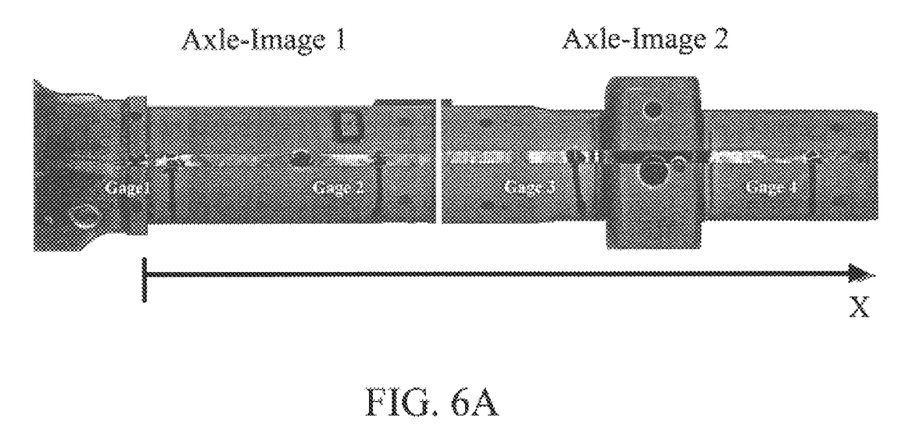
FIG. 6 shows a view of a four point bending test with strain maps obtained from the subject invention and finite element strain maps of an automobile axle.
Figure 6B:
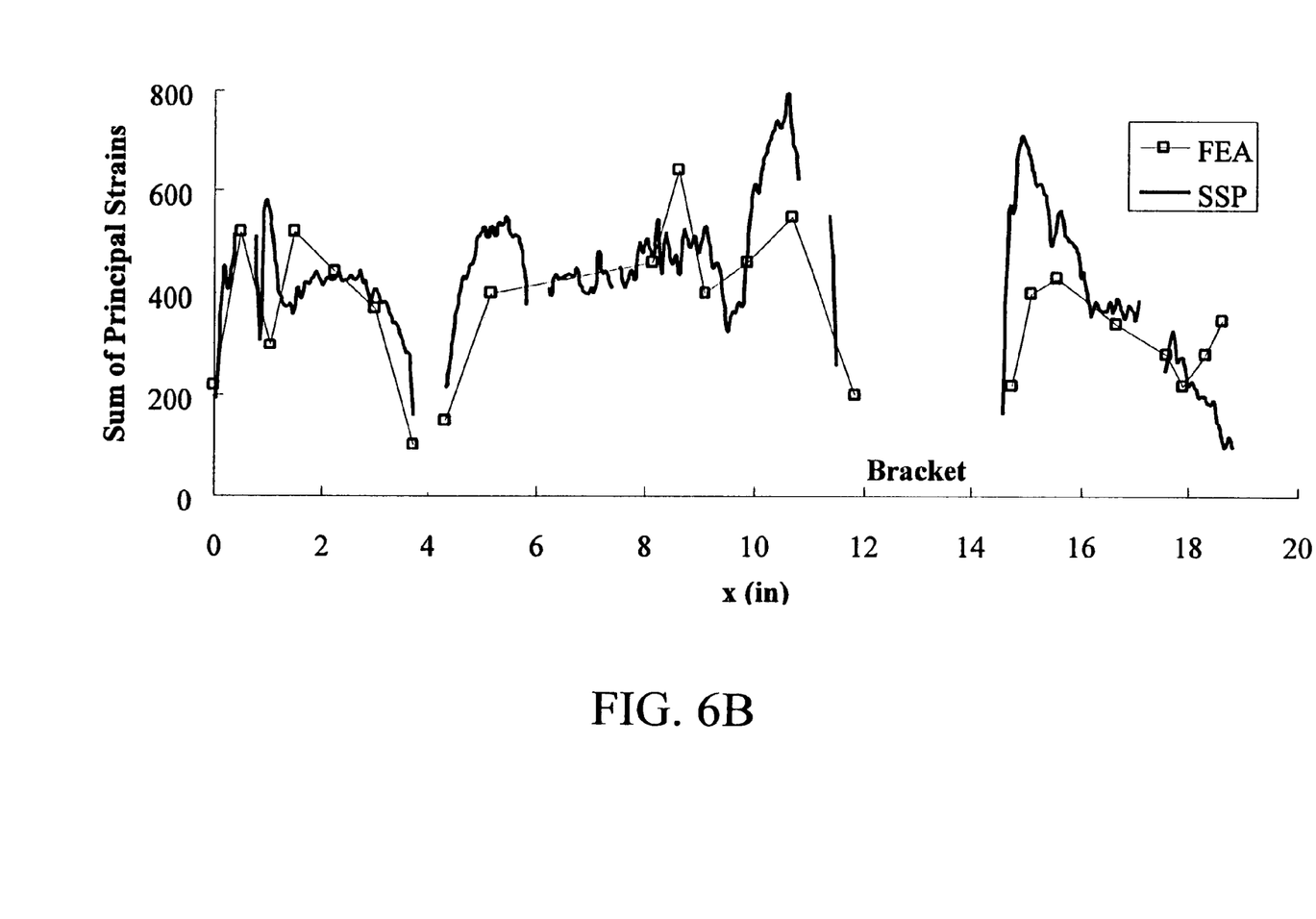

This example describes the implementation of the subject invention on a structure with complex geometry. The implementation is consistent with the preferred embodiment of the subject invention. The structure is an automobile axle which was subjected to loads that simulate road load conditions. FIG. 6 shows a comparison of a Finite Element Analysis (FEA) of the structure and the results obtained using the subject invention. Good correlation was observed.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A method for measuring strain on a substrate material comprising the steps of:
   applying a luminescent coating to a substrate material;
   curing said coating;
   illuminating said coating with excitation illumination; and
   measuring one or more characteristic(s) of luminescent light emanating from said coating in order to determine strain on the substrate material, wherein said one or more characteristic(s) of luminescent light emanating from the coating is related to strain on the substrate material due, at least in part, to a relationship between the amount of strain on the substrate material and the morphology of cracks in said coating.

2. The method according to claim 1, wherein said one or more characteristic(s) of the luminescent light emanating from the coating are selected from the group consisting of: state of polarization, intensity, spectral position, band shape, and emission decay time.

3. The method according to claim 2, wherein said one or more characteristics of light emanating from the coating are measured by a measuring system having a spatial resolution such that individual cracks are not observed.

4. The method according to claim 1, wherein cracks are established in the coating during the step of curing said coating.

5. The method according to claim 4, further comprising the step of roughening a surface of the substrate material to which the coating is to be applied, prior to the step of applying the coating.

6. The method according to claim 5, wherein the step of roughening said surface of the substrate material involves one or more techniques selected from the group consisting of: sandblasting, sandpapering, and chemical etching.

7. The method according to claim 4, wherein a dry lakebed pattern of cracks is achieved during the curing process.

8. The method according to claim 1, wherein cracks develop in said coating when said substrate material is strained.

9. The method according to claim 1, wherein said luminescent coating comprises:
   a binder, and
   at least one luminescent compound.

10. The method according to claim 9, wherein said at least one luminescent compound includes at least one luminescent dye, wherein said at least one dye is dispersed within said binder.

11. The method according to claim 10, wherein at least one of said at least one dye absorbs the excitation illumination of a first wavelength and reemits light of a second wavelength.

12. The method according to claim 11, wherein at least one other of said at least one dye compensates for one or more interferences selected from the group consisting of: temperature variations, illuminating field variations, pressure variations, and humidity variations.

13. The method according to claim 1, wherein said cracks change morphology as the strain on the substrate material changes such that the change in crack morphology causes a change in said one or more characteristic(s) of the luminescent light emanating from the coating, wherein said one or more characteristic(s) of the luminescent light emanating from the coating is related to the strain on the substrate material such that the strain on the substrate material can be determined by measuring said one or more characteristic(s) of the luminescent light emanating from the coating.

14. The method according to claim 13, wherein the change in crack morphology includes changes in one or more of the group consisting of:
   crack geometry, crack width, crack density, crack orientation, crack surface texture, crack depth, and crack opening.

15. The method according to claim 13, wherein the intensity of the luminescent light emanating from the coating is a function of the strain on the substrate material.

16. The method according to claim 13, wherein the intensity of the luminescent light emanating from the coating is approximately linearly related to the strain on the substrate material.

17. The method according to claim 13, further comprising the steps of: applying a calibration coating to a calibration substrate; curing said calibration coating; illuminating said calibration coating with excitation illumination; applying a plurality of calibration strains to the calibration substrate and measuring said one or more characteristic(s) of the luminescent light emanating from said calibration coating while each of said calibration strains is applied to the calibration substrate, and measuring each of said plurality of calibration strains with a strain measuring device, wherein the measured values of said one or more characteristic(s) of the luminescent light emanating from said coating, when each of said calibration strains is applied to the substrate, is utilized to calibrate said coating.

18. The method according to claim 17, wherein calibrating the coating results in a calibration function K for the coating, such that a strain map can be produced by applying the following algorithm $$[\text{strain map}]=K*f([\text{image S}]/[\text{image R}])$$

where [strain map], [image S], and [image R] are matrices containing digital image data, and f(v) is a smoothing function, and wherein [image R] is based on an image of said one or more characteristics of light emanating from the coating when the substrate material is not strained and [image S] is based on an image of said one or more characteristics of light emanating from the coating when the substrate is strained.

19. The method according to claim 1, wherein the step of applying a luminescent coating to a substrate material involves the use of one or more techniques selected from the group consisting of:
   aerosol technology, electrostatic deposition, chemical vapor deposition, painting, spin coating, and dip coating.

20. The method according to claim 1, wherein said substrate material is selected from the group consisting of metal, polymer, ceramic, and composite.

21. The method according to claim 1, wherein said excitation illumination is near ultraviolet light to blue light.

22. The method according to claim 21, wherein said luminescent light is red-shifted with respect to the excitation illumination.

23. The method according to claim 1, wherein a full-field strain map of the substrate material is achieved.

24. The method according to claim 1, wherein the steps of illuminating said coating with excitation illumination and measuring said one or more characteristics of luminescent light emanating from the coating are performed repeatedly to indicate how the strain on the substrate material varies with time.

25. The method according to claim 1, wherein the measured strain on the substrate material provides a value of the addition of a first and second in-plane principal strains in the substrate material, wherein said method further comprises the step of determining said first in-plane principal strain such that the second in-plane principal strain can be arrived at by subtracting the first in-plane principal strain from the addition of the first and second in-plane principal strains.

26. The method according to claim 25, wherein said first in-plane principal strain is measured with an electrical resistance strain gauge.

27. The method according to claim 25, wherein the measured strain on the substrate material provides a value of the addition of a first and second in-plane principal strains in the substrate material, wherein said coating has photoelastic characteristics such that a value of the subtraction of the first and second in-plane principal strains can be obtained and combined with the value of the addition of the first and second in-plane principal strains to determine both the first and second in-plane principal strains.

28. The method according to claim 1, wherein the step of measuring one or more characteristics of luminescent light emanating from said coating is accomplished using a technique selected from the group consisting of: visual inspection, still photography using silver halide film technology, analog video photography, and digital photography using a scientific grade CCD camera.

29. The method according to claim 28, wherein one or more devices are used during the imaging process to enhance the image, wherein said one or more devices are selected from the group consisting of: a filter, a polarizer, quarter-wave plate, and diffuser.

30. A strain field mapping system, comprising:
a means for illuminating a luminescent coating on a substrate material, wherein one or more characteristic(s) of luminescent light emanating from the coating is related to an amount of strain on the substrate material, due, at least in part, to a relationship between the amount of strain on the substrate material and the morphology of cracks in said coating; and
a means for measuring said one or more characteristic(s) of the luminescent light emanating from the coating, wherein the measurement of said one or more characteristic(s) of the luminescent light emanating from the coating provides information with respect to the strain on the substrate material.

31. The strain field mapping system according to claim 30, wherein said one or more characteristic(s) of the luminescent light emanating from the coating are selected from the group consisting of:
state of polarization, intensity, spectral position, band shape, and emission decay time.

32. The strain field mapping system according to claim 30, wherein cracks are established in the coating while the coating is curing.

33. The strain field mapping system according to claim 32, wherein said cracks change morphology as the strain on the substrate material changes such that the change in crack morphology causes a change in said one or more characteristic(s) of the luminescent light emanating from the coating, wherein said one or more characteristic(s) of the luminescent light emanating from the coating is related to the strain on the substrate material such that the strain on the substrate material can be determined by measuring said one or more characteristic(s) of the luminescent light emanating from the coating.

34. The strain field mapping system according to claim 33, wherein one of said one or more characteristic(s) is the intensity of the luminescent light emanating from the coating.

35. The strain field mapping system according to claim 34, wherein the change in crack morphology includes changes in one or more of the group consisting of:
crack geometry, crack width, crack density, crack orientation, crack surface texture, crack depth, and crack opening.

36. The strain field mapping system according to claim 34, wherein the intensity of the luminescent light emanating from the coating is a function of the strain on the substrate material.

37. The strain field mapping system according to claim 34, wherein the change in the intensity of the luminescent light emanating from the coating is a function of the change in strain on the substrate material.

38. The strain field mapping system according to claim 30, wherein cracks develop in said coating when said substrate material is strained.

39. The strain field mapping system according to claim 30, wherein said luminescent coating comprises:
a binder; and
at least one luminescent compound.

40. The strain field mapping system according to claim 39, wherein said at least one luminescent compound includes at least one luminescent dye, wherein said at least one dye is dispersed within said binder.

41. The strain field mapping system according to claim 40, wherein at least one of said at least one dye compensates for one or more interferences selected from the group consisting of: temperature variations, illuminating field variations, pressure variations, and humidity variations.

42. The strain field mapping system according to claim 30, wherein said excitation illumination is near ultraviolet to blue light.

43. The strain field mapping system according to claim 30, wherein the means for measuring one or more characteristics of luminescent light emanating from said coating utilizes one or more techniques selected from the group consisting of: visual inspection, still photography using silver halide film technology, analog video photography, and digital photography using a scientific grade CCD camera.

44. The strain field mapping system according to claim 43, further comprising one or more devices to enhance the image, wherein said one ore more devices are selected from the group consisting of: a filter, a polarizer, quarter-wave plate, and diffuser.

45. The strain field mapping system according to claim 30, further comprising a means for calibrating said coating.

46. A luminescent coating, comprising:
a binder; and
at least one luminescent compound,
wherein said coating can be applied to a substrate material such that when said coating is illuminated by excitation illumination, said at least one luminescent compound absorbs the excitation illumination of a first wavelength and reemits light of a second wavelength which can then emanate from the coating, wherein one or more characteristic(s) of the light emanating from the coating is related to the strain on the substrate material due, at least in part, to a relationship between the strain on the substrate material and the morphology of cracks in the coating.

47. The luminescent coating according to claim 46, comprising one or more of the group consisting of: poly (methylmethacryate), poly(imide), poly(esters), polyamine, poly(melamines), poly(urethanes), melamine formaldehyde, ceramics, and glasses, poly-(methylmethacryate-co-butylmethacrylate), poly(melamine-formaldehyde), polyurethane, and hybrid organic-inorganic sol-gel.

48. The luminescent coating according to claim 46, wherein said at least one luminescent compound is selected from the group consisting of: conjugated organic dyes, poly(phenylenevinylene),cyanines, 1,5,15,20-tetraphenylporphyrin zinc(II), trans-4-[4-(dimethylamino) styryl]-1-methylpyridinium iodide, trans,trans-1,4-[bis-3,4, 5-(trimethoxystyryl)]benzene, and tris-(4,7-diphenyl-1, 10-phenanthroline)-ruthenium(II) dichloride.

49. The luminescentcoating according to claim 46, wherein said coating is produced by mixing approximately 0.450 g of ERL 4206 epoxy resin, approximately 0.010 g of Epon 826 epoxy resin, approximately 0.540 g of HY 918 hardener, approximately 0.006 of 4-(dimethylamino) pyridine, and approximately 0.003 g of perylene.

50. The luminescentcoating according to claim 46, wherein said coating is produced by dispersing a luminescent dye into a binder made from a resin to which a plasticizer and a catalyst have been added in a ratio of about 100 grams of resin to about 3 to 7 grams of plasticizer to about 0.5 to 2 grams of catalyst.

51. The luminescent coating according to claim 50, wherein Rhodamine B is used as the luminescent dye, p-Toluenesulfonamide is used as the plasticizer, Ammonium Chloride is used as the catalyst, and Melamine Formaldehyde is used as the resin.

52. The luminescent coating according to claim 46, wherein said coating has photoelastic characteristics such that a value of the subtraction of a first and second in-plane strains can be obtained.

\* \* \* \* \*

UNITED STATES PATENT AND TRADEMARK OFFICE
CERTIFICATE OF CORRECTION

PATENT NO.    : 6,327,030 B1
DATED         : December 4, 2001
INVENTOR(S)   : Peter Ifju et al.

It is certified that error appears in the above-identified patent and that said Letters Patent is hereby corrected as shown below:

<u>Title page,</u>
Item [75], Inventors, ninth inventor "Yibling Shen" should read -- Yibing Shen --.

<u>Column 5,</u>
Line 67, "material In" should read -- material. In --.

<u>Column 6,</u>
Line 1, "luminescentintensity" should read -- luminescent intensity --.

<u>Column 10,</u>
Line 12, "algorithm" should read -- algorithm: --.

<u>Column 12,</u>
Lines 58 and 64, "the luminescentcoating" should read -- The luminescent coating --.

Signed and Sealed this

Twentieth Day of August, 2002

Attest:

JAMES E. ROGAN
Attesting Officer
Director of the United States Patent and Trademark Office